US012160089B1

(12) United States Patent
Ban et al.

(10) Patent No.: US 12,160,089 B1
(45) Date of Patent: Dec. 3, 2024

(54) SPARK PLUG

(71) Applicant: Niterra Co., Ltd., Nagoya (JP)

(72) Inventors: Kenji Ban, Nagoya (JP); Naoyuki Mukoyama, Nagoya (JP); Kento Kubota, Nagoya (JP)

(73) Assignee: NITERRA CO., LTD., Nagoya (JP)

( * ) Notice: Subject to any disclaimer, the term of this patent is extended or adjusted under 35 U.S.C. 154(b) by 0 days.

(21) Appl. No.: 18/747,514

(22) Filed: Jun. 19, 2024

(30) Foreign Application Priority Data

Jun. 20, 2023 (JP) ................................ 2023-100494

(51) Int. Cl.
*H01T 13/32* (2006.01)
*H01T 13/39* (2006.01)
*H01T 13/52* (2006.01)

(52) U.S. Cl.
CPC ............ *H01T 13/52* (2013.01); *H01T 13/32* (2013.01); *H01T 13/39* (2013.01)

(58) Field of Classification Search
CPC ................................ H01T 13/20; H01T 13/32
USPC ......................................................... 313/118
See application file for complete search history.

(56) References Cited

U.S. PATENT DOCUMENTS

| | | | | |
|---|---|---|---|---|
| 9,853,423 | B1 * | 12/2017 | Sumoyama | H01T 13/38 |
| 2012/0062099 | A1 * | 3/2012 | Miyashita | H01T 21/02 313/144 |
| 2013/0221832 | A1 * | 8/2013 | Ishiguro | H01T 13/02 313/144 |
| 2016/0268781 | A1 * | 9/2016 | Kato | H01T 13/20 |

FOREIGN PATENT DOCUMENTS

| | | | | |
|---|---|---|---|---|
| JP | 2009163923 | A | * | 7/2009 |
| JP | 2014-071976 | A | | 4/2014 |
| JP | 2015088364 | A | * | 5/2015 |

* cited by examiner

*Primary Examiner* — Christopher M Raabe
(74) *Attorney, Agent, or Firm* — KUSNER & JAFFE

(57) ABSTRACT

A spark plug includes a center electrode includes a base member, a tip and a melted portion. In a projection view formed by projecting the spark plug perpendicularly to an axial line direction, when an angle that is formed by a discharge surface of the tip and a straight line passing through a first boundary between the tip and the melted portion and a second boundary between the melted portion and the base member, the first boundary and the second boundary being located at two ends of an external shape line of the melted portion, expressed by θ, a distance between the first boundary and the discharge surface in the axial line direction expressed by A, and a distance between the first boundary and the second boundary in a direction perpendicular to the axial line expressed by B, 0<A/B≤1 and θ≤70° are satisfied.

3 Claims, 3 Drawing Sheets

SPARK PLUG

FIELD OF THE INVENTION

The present invention relates to a spark plug in which a center electrode and a ground electrode face each other.

BACKGROUND OF THE INVENTION

Japanese Unexamined Patent Application Publication No. 2014-71976 discloses a related art relating to a spark plug including a center electrode in which a tip that is made of a material that differs from a material of a base member is welded to the base member and extends in an axial line direction, and a ground electrode that faces a discharge surface of the tip in the axial line direction. According to the related art, a distance between the discharge surface of the tip and a welded portion and the shape of the welded portion are set to reduce electrical field intensity at the welded portion of the center electrode and reduce electric discharge that starts from the welded portion.

The related art has an issue that generation of a flame kernel by electric discharge is unstable.

The present invention has been made to solve this issue, and an object of the present invention is to provide a spark plug capable of improving stability in generation of a flame kernel by electric discharge between electrodes.

SUMMARY OF THE INVENTION

A first aspect of the present invention for achieving this object includes a center electrode that extends in an axial line direction and that includes a base member, a tip that is made of a material that differs from a material of the base member, and a melted portion that connects the tip to the base member; and a ground electrode that faces a discharge surface of the tip in the axial line direction. In a projection view formed by projecting the spark plug perpendicularly to the axial line direction, when an angle that is formed by a straight line that passes through a first boundary between the tip and the melted portion and a second boundary between the melted portion and the base member, the first boundary and the second boundary being located at two ends of an external shape line of the melted portion, and the discharge surface is represented by θ, a distance between the first boundary and the discharge surface in the axial line direction is represented by A, and a distance between the first boundary and the second boundary in a perpendicular direction perpendicular to the axial line direction is represented by B, $0<A/B\leq 1$ and $\theta\leq 70°$ are satisfied.

A second aspect is the first aspect in which $0<A/B\leq 0.77$ is satisfied.

A third aspect is the first or second aspect in which $G\leq C$ is satisfied when a distance between the discharge surface and the ground electrode in the axial line direction is represented by G and a length of the discharge surface in a perpendicular direction is represented by C.

Due to the tip of the center electrode and the melted portion having a relationship of $0<A/B\leq 1$ and $\theta\leq 70°$, stability in generation of flame kernel by electric discharge between the electrodes can be improved by electrical field intensity of the melted portion.

DETAILED DESCRIPTION OF THE INVENTION

Figure 1:
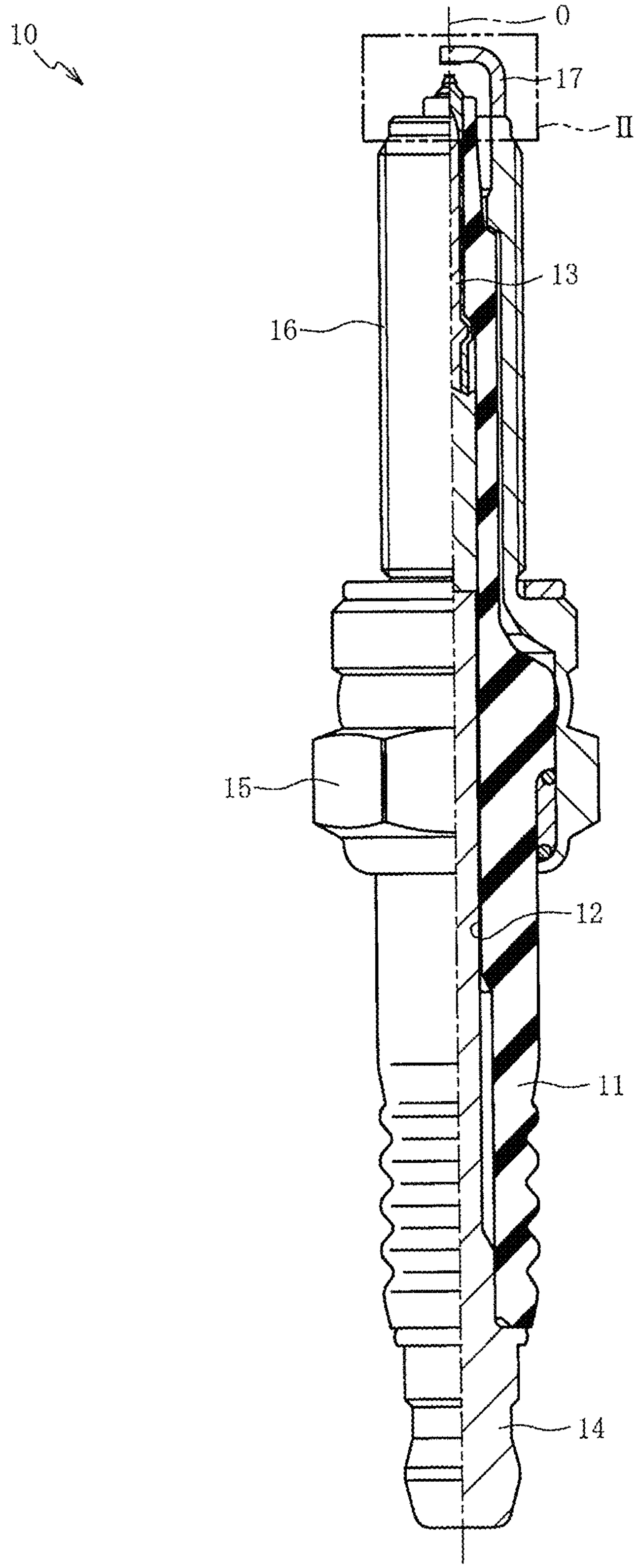
FIG. 1 is a one-side sectional view of a spark plug in one embodiment.

Hereinafter, a preferred embodiment of the present invention will be described with reference to the accompanying drawings. FIG. 1 is a one-side sectional view of a spark plug 10 in one embodiment and in which an external view and a full sectional view border on each other along an axial line O are combined together. The lower side of the spark plug 10 in FIG. 1 is referred to as a tail end side, and the upper side of the spark plug 10 in FIG. 1 is referred to as a tip end side (the same is true in FIG. 2 and FIG. 3).

As illustrated in FIG. 1, the spark plug 10 includes an insulator 11, a center electrode 13 that is held by the insulator 11, a metal shell 15 that holds the insulator 11 from the outer peripheral side of the insulator 11, and a ground electrode 17 that is connected to the metal shell 15. The insulator 11 is a substantially cylindrical member that is made of ceramic, such as alumina, excellent in mechanical properties and insulating properties under high temperature. The insulator 11 has an axial hole 12 that extends along the axial line O.

The center electrode 13 is a rod-shaped conductor that is disposed in the axial hole 12 of the insulator 11 and that extends along the axial line O. The center electrode 13 includes a core member containing copper as a main component and a metal bottomed cylinder that covers the core member. The core member can be omitted. An example of metal that mainly constitutes the center electrode 13 is a Ni-based alloy. The tip end side of the center electrode 13 projects along the axial line O from the tip of the insulator 11.

The center electrode 13 is electrically connected in the axial hole 12 to a metal terminal 14. The metal terminal 14 is a rod-shaped member to which an ignition system (not illustrated) is to be connected and is made of a metal material (for example, a low-carbon steel or the like) having electrical conductivity. The metal terminal 14 is fixed to the tail end side of the insulator 11 in a state in which the tip end side of the metal terminal 14 is inserted into the axial hole 12 and the tail end side thereof projects from the insulator 11.

The metal shell 15 is fixed to the outer periphery of the insulator 11. The metal shell 15 is a cylindrical member that is made of a metal material (for example, low-carbon steel). The metal shell 15 is provided with an external screw 16 that is coupled with an internal screw of a plug hole of an engine (not illustrated). The ground electrode 17 is connected to the tip of the metal shell 15.

The ground electrode 17 is a conductor that extends from the metal shell 15 toward the axial line O. An example of the ground electrode 17 is a ground electrode in which a core member that contains copper as a main component is embedded in metal that contains Ni as a main component. The core member can be omitted. In the present embodiment, the ground electrode 17 is bent from the metal shell 15 toward the center electrode 13.

Figure 2:
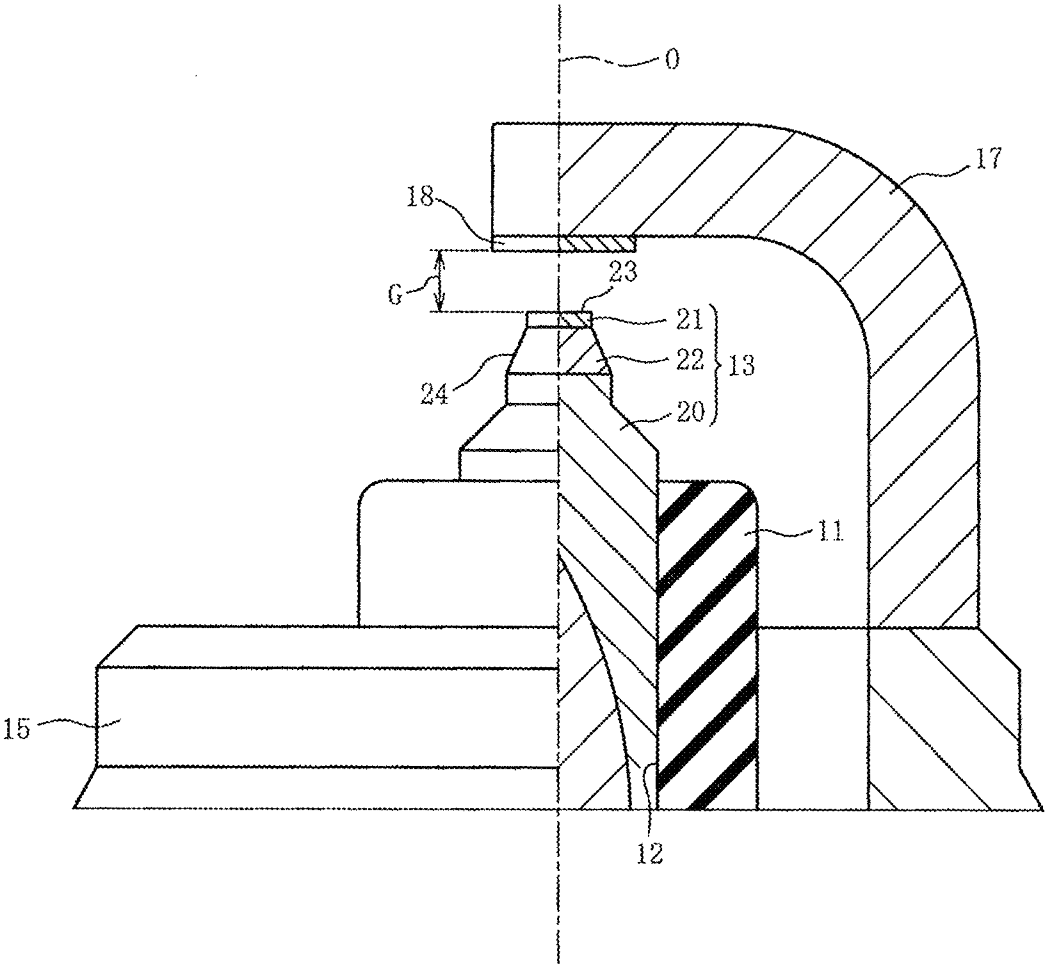
FIG. 2 is a one-side sectional view of the spark plug, in which a portion indicated by II in FIG. 1 is enlarged.

FIG. 2 is a one-side sectional view of the spark plug 10, in which a portion indicated by II in FIG. 1 is enlarged. A tip 18 that faces the tail end side is provided at, of the ground electrode 17, a portion that intersects the axial line O. An example of the material of the tip 18 is a material that contains at least one selected from noble metal elements including Pt, Ir, Ru, Rh, and the like. The tip 18 can be omitted.

The center electrode 13 includes a base member 20, a tip 21 that is made of a material that differs from a material of the base member 20, and a melted portion 22 that connects the tip 21 to the base member 20. The base member 20 is a metal member to which the tip 21 is joined, and an example of the material of the base member 20 is a material that contains Ni as a main component and contains Cr, Fe, or the like. The external shape of the base member 20 becomes smaller toward the tip end side.

An example of the material of the tip 21 is a material that contains at least one selected from noble metal elements including Pt, Ir, Ru, Rh, and the like. The tip 21 has a disk shape in the present embodiment but is not limited thereto. A discharge surface 23 of the tip 21 faces the ground electrode 17 (the tip 18 in the present embodiment) in the axial line direction. A distance between the discharge surface 23 and the ground electrode 17 in the axial line direction is represented by G.

The melted portion 22 is formed by the base member 20 and the tip 21 that have been melted together. The melted portion 22 is produced by laser beam welding in the present embodiment. It is naturally possible to produce the melted portion 22 by resistance welding or the like. Since the external shape of the melted portion 22 becomes thinner toward the tip end side, the tip end side of an external shape line 24 indicating the shape of the melted portion 22 is closer than the tail end side thereof to the axial line O. Consequently, it is possible to make the tip 21 thinner than the base member 20 and thus is possible to make the thermal capacity of the tip 21 smaller than the thermal capacity of the base member 20. The energy of a flame kernel generated by spark discharge between the center electrode 13 and the ground electrode 17 is thus not easily taken by the tip 21.

Figure 3:
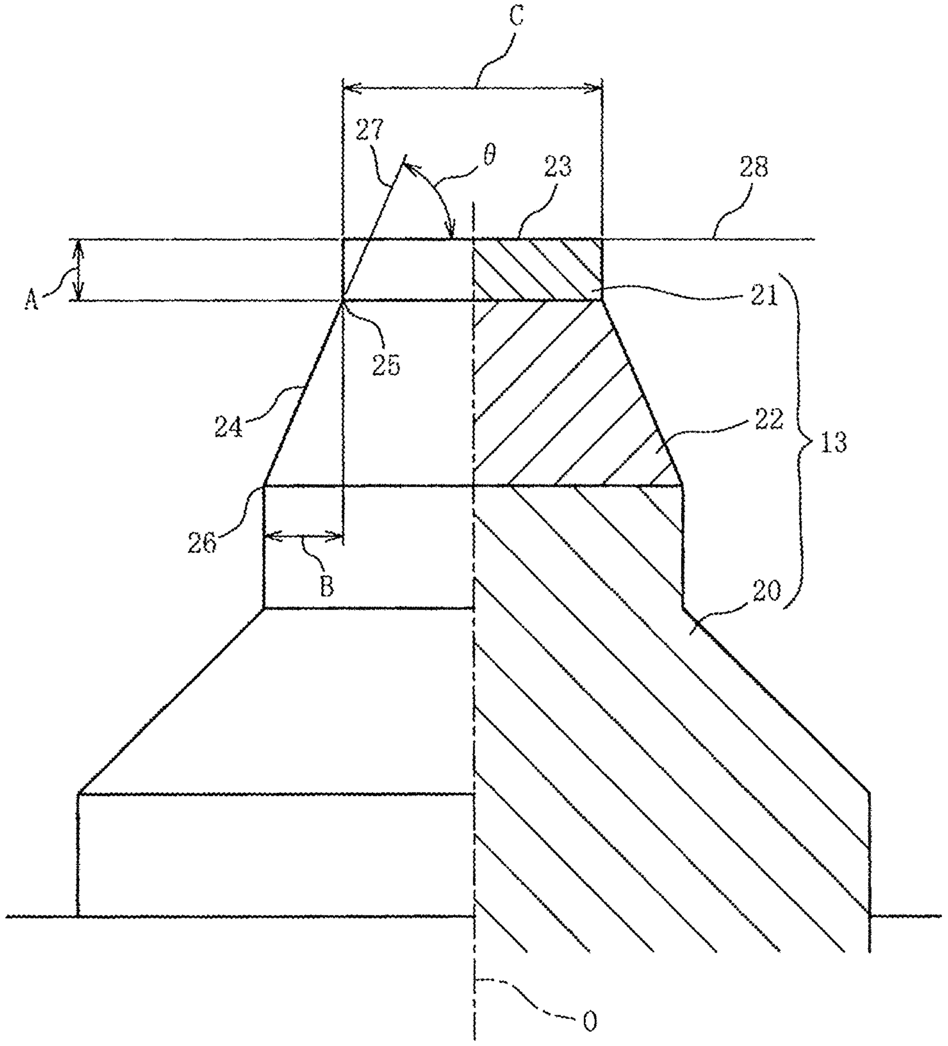
FIG. 3 is a one-side sectional view of a center electrode.

FIG. 3 is a one-side sectional view including the axial line O of the center electrode 13. In a projection view (equal to the external view on the left side of the axial line O in FIG. 3) formed by projecting the center electrode 13 perpendicularly to the axial line O, the external shape line 24 of the melted portion 22 connects a first boundary 25 between the tip 21 and the melted portion 22 and a second boundary 26 between the base member 20 and the melted portion 22 to each other. In the present embodiment, the length of the external shape line 24 in the axial line direction is larger than a distance A between the first boundary 25 and the discharge surface 23 in the axial line direction. Since the volume of the melted portion 22 can be ensured, the strength of joining the tip 21 by the melted portion 22 can be ensured.

An angle θ (acute angle) that is formed by a straight line 27 passing through the first boundary 25 and the second boundary 26 and a straight line 28 perpendicular to the axial line O is 70° or less. The line indicating the discharge surface 23 partially overlaps the straight line 28 in the present embodiment but is not limited thereto. This is because, even when the line indicating the discharge surface 23 is not perpendicular to the axial line O, the line is included in the range of tolerance of the spark plug 10.

In the spark plug 10, when a distance between the first boundary 25 and the second boundary 26 in a perpendicular direction perpendicular to the axial line O is represented by B, the relationship of the distances A and B and θ satisfies $0<A/B\leq 1$ and $\theta\leq 70°$. More preferably, $0<A/B\leq 0.77$ and $\theta\leq 70°$ are satisfied. When $0<A/B\leq 1$ and $\theta\leq 70°$ are satisfied, the melted portion 22 of the center electrode 13 is close to the ground electrode 17. Therefore, the electrical field intensity in the vicinity of the tip 21 can be increased by the melted portion 22. Due to electrical-field concentration of the melted portion 22, electric discharge easily occurs between the center electrode 13 and the ground electrode 17. It is thus possible to improve stability in generation of a flame kernel by electric discharge between the electrodes.

Since stability in generation of a flame kernel by electric discharge between the electrodes can be improved, the spark plug 10 is naturally suitable for a gasoline engine, in which the spark plug 10 ignites an air-fuel mixture of air and a liquid fuel such as gasoline and is also suitable for a hydrogen engine, in which hydrogen is used as a fuel, a gas engine, in which the spark plug 10 ignites a gas fuel such as a coal gas, a town gas, a natural gas, and a biogas, and the like.

When a portion that satisfies $0<A/B\leq 1$ and $\theta\leq 70°$ is present in the center electrode 13, electric discharge easily occurs between the center electrode 13 and the ground electrode 17 by using the electrical field intensity of the melted portion 22. Therefore, the distances A and B and the angle θ may be measured on the basis of a projection view formed by projecting the spark plug 10 perpendicularly to the axial line O from any direction. The distances A and B and the angle θ are, however, preferably measured using as a reference the external shape line 24 of the left end of the melted portion 22 on the basis of a projection view (refer to FIG. 2) that is formed such that a portion at which the ground electrode 17 is connected to the metal shell 15 is positioned at the right end of the projection view. This is because it is possible to make the tip 21 and the melted portion 22 not to be hidden by the ground electrode 17 in the projection view and thus is possible in the projection view in which the distances A and B and the angle θ are measured to measure also a length C and the distance G.

In the spark plug 10, when the length of the discharge surface 23 in the perpendicular direction is represented by C, the length C is preferably larger than or equal to the distance G (refer to FIG. 2). When the length C is less than the distance G, the electrical field intensity between the center electrode 13 and the ground electrode 17 is small and tends to cause electric discharge not to easily occur.

EXAMPLES

The present invention will be described more specifically on the basis of examples. The present invention is, however, not limited to the examples.

Example 1

An examiner prepared samples No. 1 to No. 11 of the spark plug 10 that differ from each other in terms of the distances A and B and the angle θ of the center electrode 13. Except for the distances A and B and the angle θ, dimensions and materials of portions were constant in the samples No. 1 to No. 11. For example, the nominal diameter of the external screw 16 of the metal shell 15 was 12 mm, the length C of the discharge surface 23 of the tip 21 was 0.6 mm, and the distance G between the discharge surface 23 and the ground electrode 17 was 0.8 mm.

The examiner connected an ignition system (not illustrated) to the metal terminal 14 of each sample that is attached to a gasoline engine, and measured the voltage (required voltage) of a secondary winding when the sample was broken down (spark discharge occurred). As operation conditions of the engine, engine revolution was set to 2000 rpm, a net mean effective pressure (NMEP) of 1200 kPa was set as a load, and the compression ratio, the intake pressure, the air/fuel ratio, and the like were set to be constant.

The required voltage of each sample was measured 1000 times, and the average of the 1000 required voltages was calculated. Compared with the average of the required voltages of the sample No. 11, samples whose average of the required voltages was lower by 1.0 kV or more were judged as A, samples whose average of the required voltages was lower by 0.5 KV or more and less than 1.0 KV were judged as B, samples whose average of the required voltages was lower by more than 0 KV and less than 0.5 KV were judged as C, and samples whose average of the required voltages had no difference or was higher were judged as D. Table 1 shows results.

TABLE 1

| No. | A (mm) | B (mm) | A/B (—) | θ (°) | Judgement |
|---|---|---|---|---|---|
| 1 | 0.05 | 0.17 | 0.29 | 45 | A |
| 2 | 0.05 | 0.18 | 0.28 | 70 | A |
| 3 | 0.09 | 0.14 | 0.64 | 70 | A |
| 4 | 0.10 | 0.13 | 0.77 | 70 | A |
| 5 | 0.13 | 0.16 | 0.81 | 70 | B |
| 6 | 0.16 | 0.16 | 1.00 | 70 | B |
| 7 | 0.26 | 0.14 | 1.86 | 70 | C |
| 8 | 0.40 | 0.16 | 2.50 | 70 | C |
| 9 | 0.16 | 0.16 | 1.00 | 88 | C |
| 10 | 0.06 | 0.18 | 0.33 | 88 | D |
| 11 | 0.45 | 0.15 | 3.00 | 70 | — |

As shown in Table 1, the samples No. 1 to No. 6 were judged as A or B, and the average of the required voltages thereof was decreased by 0.5 kV or more compared with the sample No. 11. The samples No. 7 to No. 10 were judged as C or D, and the average of the required voltages thereof was decreased by only less than 0.5 KV at maximum compared with the sample No. 11. The decrease in the required voltage by 0.5 kV or more means that, compared with the sample No. 11, a fuel can be ignited by a spark discharge voltage lower by 0.5 kV or more, in other words, stability in generation of a flame kernel by electric discharge is high in each of the samples No. 1 to No. 6.

When the samples No. 1 to No. 6 and the samples No. 7 to No. 10 are compared, the samples No. 1 to No. 6 each satisfied $0<A/B\leq1$ and $\theta\leq70°$ while the samples No. 7 and No. 8 each satisfied $A/B>1$ and the samples No. 9 and No. 10 each satisfied $\theta>70°$. Accordingly, it has been found that stability in generation of a flame kernel by electric discharge between the electrodes can be improved when $0<A/B\leq1$ and $\theta\leq70°$ are satisfied.

In particular, the samples No. 1 to No. 4 were judged as A, and the average of the required voltages thereof was decreased by 1.0 kV or more compared with the sample No. 11. The samples No. 1 to No. 4 each satisfied $0<A/B\leq0.77$ and $\theta\leq70°$. Accordingly, it has been found that stability in generation of a flame kernel by electric discharge between the electrodes can be further improved when $0<A/B\leq0.77$ and $\theta\leq70°$ are satisfied.

Example 2

The examiner produced, similarly to the sample No. 6 in Example 1, samples No. 12 to No. 15 of the spark plug 10 that differ from each other in terms of the distance G. Except for the distance G, dimensions and materials of portions were constant in the samples No. 12 to No. 15. For example, the nominal diameter of the external screw 16 of the metal shell 15 was 12 mm, the distance A of the center electrode 13 was 0.16 mm, the distance B was 0.16 mm, A/B=1.00 was satisfied, the angle θ was 70°, and the length C of the discharge surface 23 was 0.6 mm.

The examiner connected an ignition system to the metal terminal 14 of each sample that is attached to a container having a constant volume and filled with air, and measured the required voltage of each sample. The required voltage is proportional to a product (P·G) of a pressure (P) in the container and the distance G between the electrodes according to the Paschen's law. Thus, after the required voltage when P·G=1.32 MPa·mm is satisfied was measured by using the sample No. 14, the required voltage of each of the samples No. 12, No. 13, and No. 15 was measured under a constant environmental temperature while changing the pressure P in accordance with the distance G such that the product of P and G satisfied 1.32 MPa·mm.

The required voltage of each sample was measured 1000 times, and the average of the 1000 required voltages was calculated. Compared with the average of the required voltages of the sample No. 14, samples whose average of the required voltages was lower were judged as E, and samples whose average of the required voltages had no difference or was higher were judged as P. Table 2 shows results.

TABLE 2

| No. | A/B (—) | θ (°) | C (mm) | G (mm) | Judgement |
|---|---|---|---|---|---|
| 12 | 1.00 | 70 | 0.6 | 0.4 | E |
| 13 | | | | 0.6 | E |
| 14 | | | | 0.8 | — |
| 15 | | | | 1.0 | P |

As shown in Table 2, the samples No. 12 and No. 13 were judged as E, and the average of the required voltages thereof was decreased compared with the samples No. 14 and No. 15. The decrease in the required voltage means that, compared with the samples No. 14 and No. 15, a fuel can be ignited by a low spark discharge voltage, in other words, stability in generation of a flame kernel by electric discharge is high in each of the samples No. 12 and No. 13. The samples No. 12 and No. 13 each satisfied $G\leq C$ while the samples No. 14 and No. 15 each satisfied $G>C$. Accordingly, it has been found that the stability in generation of a flame kernel by electric discharge between the electrodes can be further improved when $G\leq C$ is satisfied.

While the present invention has been described above on the basis of an embodiment, it is easily assumed that the present invention is not limited to the aforementioned embodiment at all and can be variously modified within a scope not deviating from the gist of the present invention.

In the embodiment, a case in which the external shape line 24 of the melted portion 22 partially overlaps the straight line 27 has been described. The external shape line 24 is, however, not limited thereto. The external shape line 24 may be a curved line that protrudes toward the axial line O, a curved line that protrudes opposite to the axial line O, and the like, and the external shape line 24 may have irregularities.

In the embodiment, a case in which the ground electrode 17 is bent has been described. The ground electrode 17 is, however, not limited thereto. It is naturally possible to dispose the ground electrode 17 having a linear shape at the tip of the metal shell 15 formed by extending a portion of the external screw 16 in the axial line direction and to cause the ground electrode 17 and the discharge surface 23 of the center electrode 13 to face each other. The linear-shaped ground electrode 17 may be disposed perpendicular to the axial line O and may be disposed to diagonally intersect the axial line O. When the ground electrode 17 diagonally intersects the axial line O, the distance G between the discharge surface 23 of the center electrode 13 and the ground electrode 17 refers to a shortest distance between the discharge surface 23 and the ground electrode 17 in the axial line direction.

In the spark plug in which the linear-shaped ground electrode 17 is disposed at the metal shell 15, there is a likelihood of the tip 21 and the melted portion 22 of the center electrode 13 being surrounded by the metal shell 15. When such a spark plug is viewed in a direction perpendicular to the axial line O, there is a likelihood of the tip 21 and the melted portion 22 being hidden by the metal shell 15. In such a case, the distances A, B, and G, the angle θ, and the length C are obtained by cutting off part of the metal shell 15 and setting the external shape line 24 of the melted portion 22 so that the tip 21 and the melted portion 22 of the center electrode 13 can be visually recognized when the spark plug is viewed in a direction perpendicular to the axial line O.

In the embodiment, the spark plug 10 in which one ground electrode 17 is disposed at the metal shell 15 has been described. The spark plug 10 is, however, not limited thereto. It is naturally possible to dispose, in addition to the ground electrode 17, at least one electrode at the metal shell 15 and cause part of the electrodes and a side surface of the center electrode 13 to face each other. Consequently, electric discharge usually occurs between the ground electrode 17 and the center electrode 13, and, when carbon accumulates on the insulator 11 due to carbon fouling, electric discharge occurs between the at least one electrode and the center electrode 13 and can burn off the carbon. It is thus possible to reduce a decrease in insulation between the ground electrode 17 and the center electrode 13.

DESCRIPTION OF REFERENCE NUMERALS

10 spark plug
11 insulator
13 center electrode
15 metal shell
17 ground electrode
20 base member
21 tip
22 melted portion
23 discharge surface of tip
24 external shape line of melted portion
25 first boundary
26 second boundary
27 straight line
28 straight line
O axial line

What is claimed is:

1. A spark plug comprising:
a center electrode that extends in an axial line direction and that includes a base member, a tip that is made of a material that differs from a material of the base member, and a melted portion that connects the tip to the base member;
an insulator that has a cylindrical shape and that holds the center electrode from an outer peripheral side of the center electrode;
a metal shell that has a cylindrical shape and that holds the insulator from an outer peripheral side of the insulator; and
a ground electrode that is connected to the metal shell and that faces a discharge surface of the tip in the axial line direction,
wherein, in a projection view formed by projecting the spark plug perpendicularly to the axial line direction, when
an angle that is formed by a straight line that passes through a first boundary between the tip and the melted portion and a second boundary between the melted portion and the base member, the first boundary and the second boundary being located at two ends of an external shape line of the melted portion, and a straight line that extends in a perpendicular direction perpendicular to the axial line direction is represented by e,
a distance between the first boundary and the discharge surface in the axial line direction is represented by A, and
a distance between the first boundary and the second boundary in the perpendicular direction is represented by B,
$0<A/B\leq 1$ and $\theta\leq 70°$ are satisfied.

2. The spark plug according to claim 1,
wherein $0<A/B\leq 0.77$ is satisfied.

3. The spark plug according to claim 1,
wherein $G\leq C$ is satisfied when
a distance between the discharge surface and the ground electrode in the axial line direction is represented by G, and
a length of the discharge surface in the perpendicular direction is represented by C.

* * * * *